United States Patent
Chen et al.

(10) Patent No.: US 8,065,402 B2
(45) Date of Patent: Nov. 22, 2011

(54) NETWORK MANAGEMENT USING SHORT MESSAGE SERVICE

(75) Inventors: Jin C J Chen, Toronto (CA); Song Song, Beijing (CN); Hao B J Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1922 days.

(21) Appl. No.: 11/039,224

(22) Filed: Jan. 19, 2005

(65) Prior Publication Data
US 2005/0160165 A1 Jul. 21, 2005

(30) Foreign Application Priority Data
Jan. 20, 2004 (CN) .................. 2004 1 00025058

(51) Int. Cl.
G06F 13/00 (2006.01)
(52) U.S. Cl. ........ 709/223; 709/245; 709/229; 709/227; 709/220
(58) Field of Classification Search .......... 709/223, 709/227–229, 245, 206, 220–222
See application file for complete search history.

(56) References Cited

U.S. PATENT DOCUMENTS

| | | | | |
|---|---|---|---|---|
| 5,901,284 A | | 5/1999 | Hamdy-Swink | 395/186 |
| 6,070,242 A | | 5/2000 | Wong et al. | 713/201 |
| 6,847,632 B1 | * | 1/2005 | Lee et al. | 370/352 |
| 6,990,352 B2 | * | 1/2006 | Pyhalammi et al. | 455/466 |
| 2001/0022837 A1 | | 9/2001 | Vasell et al. | 379/102.05 |
| 2002/0022485 A1 | * | 2/2002 | Kolsky et al. | 455/452 |
| 2002/0174236 A1 | | 11/2002 | Mathur et al. | 709/229 |
| 2003/0140252 A1 | | 7/2003 | Lafon et al. | 713/201 |
| 2003/0144016 A1 | * | 7/2003 | Kolsky et al. | 455/517 |
| 2003/0145037 A1 | * | 7/2003 | Von Garssen | 709/201 |
| 2003/0186682 A1 | * | 10/2003 | Aschir | 455/411 |
| 2004/0067761 A1 | * | 4/2004 | Pyhalammi et al. | 455/466 |
| 2006/0161680 A1 | * | 7/2006 | Balsevich | 709/245 |

FOREIGN PATENT DOCUMENTS
GB 2341523 A 3/2000

OTHER PUBLICATIONS

Eibach, W. et al. "Apparatus and Method for Establishing Communication in a Computer Network", IBM Patent Application, U.S. Appl. No. 09/386,836, filed Aug. 31, 1999.
Sun, P. et al. "Remote Control Based on a Wireless Message Service", IBM Patent Application, U.S. Appl. No. 10/243,522, filed Sep. 13, 2002.
Zhang, J. eet al. "Demanding a Video Program by Using Demand Short Message", IBM Patent Application, U.S. Appl. No. 10/667,834, filed Sep. 22, 2003.

* cited by examiner

*Primary Examiner* — Kenneth R Coulter
(74) *Attorney, Agent, or Firm* — Steven L. Nichols; VanCott, Bagley, Cornwall & McCarthy P.C.

(57) ABSTRACT

A network management method and system and a computer that provides added security against hackers. A network management command is sent to the computer via short message service (SMS). The computer performs corresponding network configuration according to the network management command. Thus, a safe network management can be assured based on the secure capabilities of SMS.

17 Claims, 4 Drawing Sheets

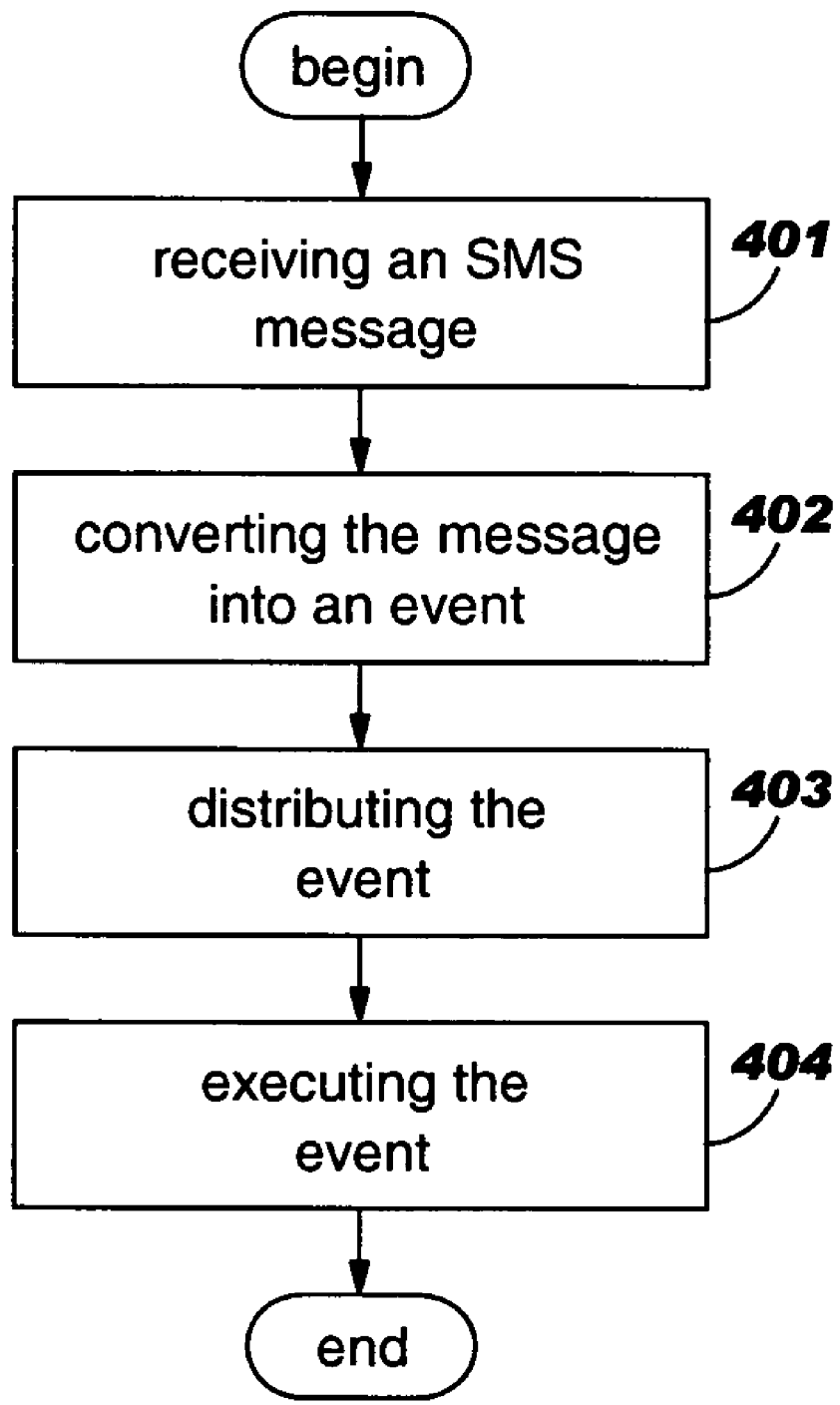

NETWORK MANAGEMENT USING SHORT MESSAGE SERVICE

FIELD OF THE INVENTION

The invention relates to a method, system, and computer for performing network management via SMS (Short Message Service) to minimize vulnerability to computer hackers.

BACKGROUND

Users employ various methods to access network resources such as the Internet. Indeed, some users have constructed small-scale network environments at home. Such users often desire to access the home-based resources from outside, freely and safely. They may always keep their computers at home connected to the Internet, and may have fixed public IP addresses. In such cases, methods such as ADSL, Ethernet, GPRS, PPP, and so forth, can be used. A common shortcoming of these methods is that the so-connected computers are liable to being attacked by hackers, since they are always exposed to the Internet environment.

In order to prevent the occurrence of attacks by hackers, users may employ technology that combines Virtual Private Networks (VPN) and firewalls. With such a combination, computer resources are located behind firewalls and have no public IP addresses, and thus the danger of being successfully attacked by hackers is greatly reduced. But such a configuration needs a specialized network manager that must itself be vigorously defended against hackers, thus increasing total cost.

Consequently, there is a need to ensure that the home-based computer resources can be accessed when needed, and that safety from attack by hackers is provided, all the while minimizing total costs.

SUMMARY

An object of the invention is to provide network management, wherein the computer resources can be safely accessed from the outside.

The invention encompasses a network management method, comprising: sending a network management command to an object via an SMS channel; and controlling the object according to the network management command.

The invention encompasses a network management system, comprising: a computer resource and a remote user terminal, which each include: an SMS message interface, used for sending SMS messages to, or receiving SMS messages from, the counterpart; an SMS message converter, used for converting received SMS messages into network management events; a network management event distributor, used for distributing network management events; and a manager for executing network management according to distributed network management events.

The invention encompasses a computer, comprising: an SMS message interface, used for receiving SMS messages; an SMS message converter, used for converting received SMS messages into network management events; a network management event distributor, used for distributing network management events; and a manager for executing network management according to distributed network management events.

According to the invention, a safe network connection is provided, because the remote user terminal can "wake up" the home computer to connect to the Internet by sending an SMS message; thus the home computer does not need to be always connected to the Internet.

Further according to the invention, even if the IP addresses of one or both of the connected parties is changed, notification can be provided by an SMS message so as to keep the connection potentially available.

In addition, according to the invention, it is possible to dynamically execute various safe authorization controls on the home computer from a remote terminal by using SMS messages.

BRIEF DESCRIPTION OF THE DRAWINGS

FIG. 4 shows an exemplary flow diagram of the network management method according to the invention.

DETAILED DESCRIPTION

Short message service (SMS) may be employed for transmitting short-text messages. Standardized SMS provides encryption and protocols needed to guarantee the safety of the user's identification and the privacy of the transmitted data. Thus, short message service reduces the risk of forgery of a sender's identity and a message's contents.

Figure 1A:
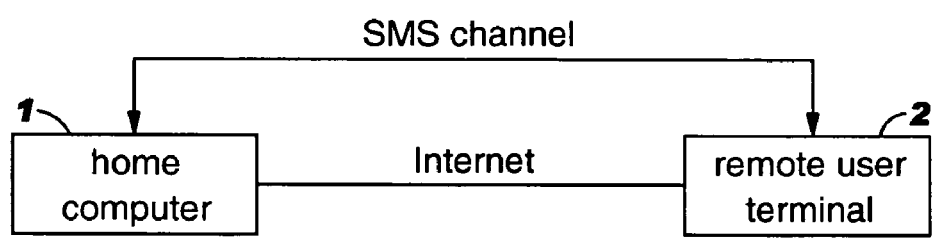
FIG. 1A shows an exemplary schematic view of a network management system according to the invention.

The invention utilizes SMS technology to perform network management. FIG. 1A shows an exemplary schematic view of a network management system according to the invention. In FIG. 1A, a home computer 1 can be accessed from a remote user terminal 2 in a conventional way, using, for example, ADSL, Ethernet, GPRS, or PPP. In addition, both the home computer 1 and the remote user terminal 2 support the SMS protocol and can communicate with each other using SMS messages.

In one embodiment of the invention, the home computer and the remote user terminal may be connected to mobile phones. In this embodiment, the SMS message communication between the home computer and the remote user terminal is implemented using the inherent function of receiving and sending SMS messages in the mobile phone.

Figure 1B:
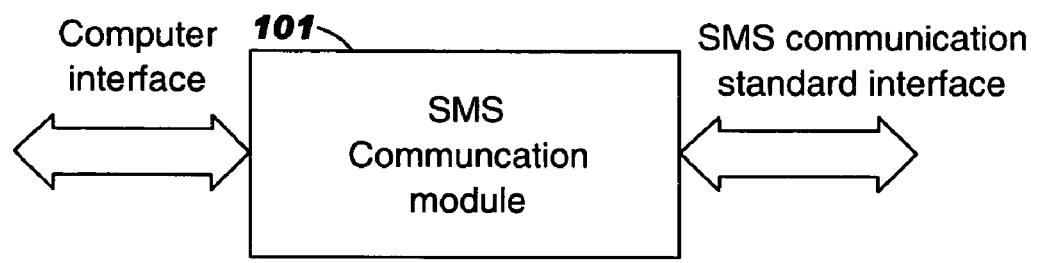
FIG. 1B shows an exemplary embodiment of an SMS communication module interface according to the invention.

In another embodiment, the home computer and the remote user terminal may both have internal SMS communication modules. The interface of such a module 101 is shown in FIG. 1B. The SMS communication module 101 provides an SMS communication interface which may conform to an industry standard for receiving and sending SMS messages, and which may utilize existing telecommunication equipment to send and receive SMS messages. The SMS communication module 101 may be connected to the home computer or the remote user terminal via another computer interface, which may conform to an interface standard such as PCI, USB, serial bus, and the like. The home computer or the remote user terminal transmits data to the SMS communication module and triggers the sending of SMS messages or presents SMS messages received by the SMS communication module via this computer interface.

According to the invention, the home computer 1 need not always be connected to the Internet. Even if the home computer 1 is not connected to the Internet or the remote user terminal 2 does not know the IP address of the home computer 1, the home computer 1 and the remote user terminal 2 according to the invention can still exchange SMS messages with each other via the SMS channel so as to perform network management. In other words, according to the invention the communication between the home computer 1 and the remote user terminal 2 and the corresponding network management are independent of the Internet.

Next the process of the network management performed by the network communication system according to the invention will be described in detail with reference to FIGS. 2 and 3.

Figure 2:
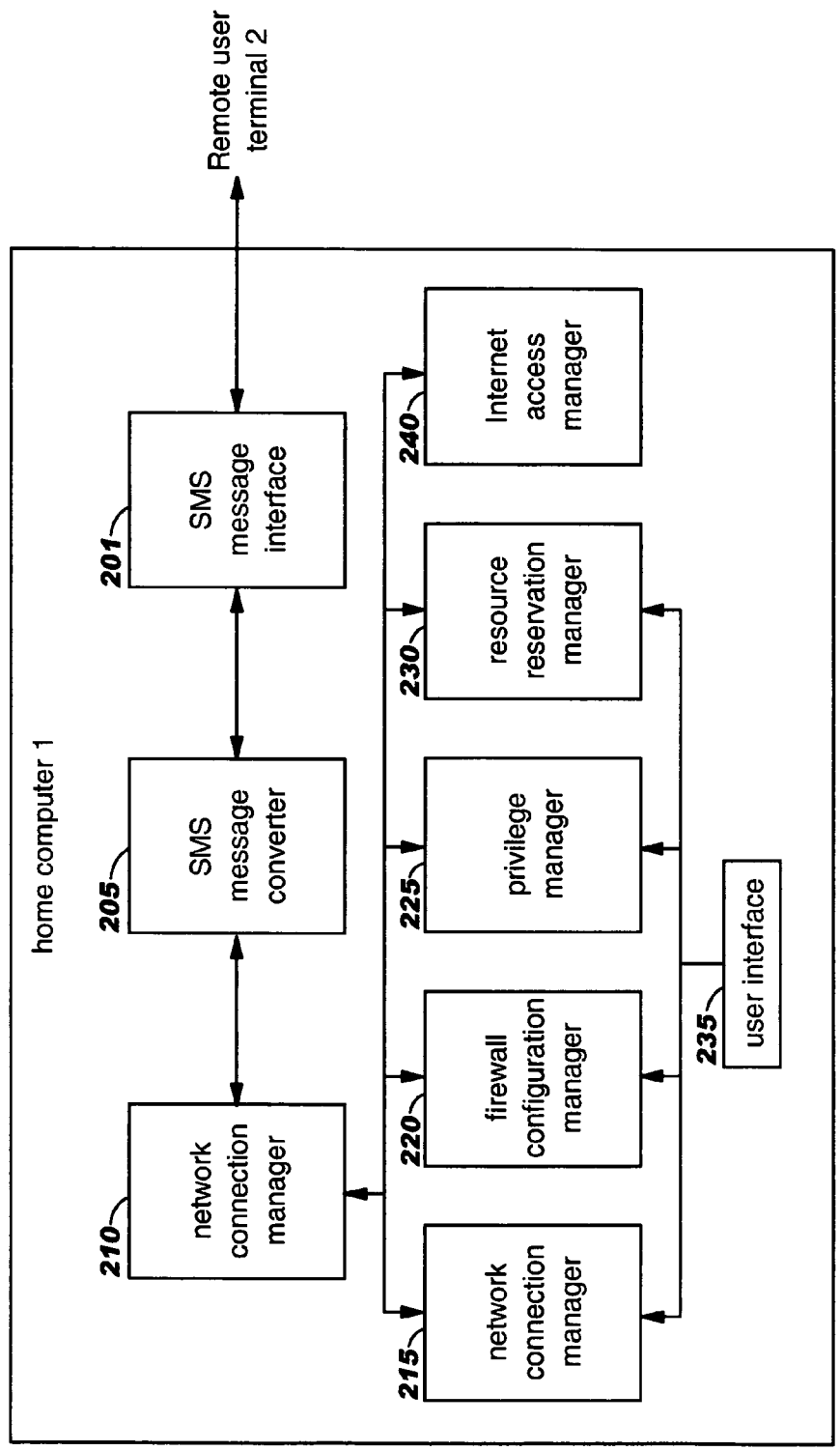
FIG. 2 shows an exemplary functional block diagram of the network management system according to the invention.

FIG. 2 shows an exemplary functional block diagram of a network management system according to the invention. The home computer 1 may include an SMS message interface 201; an SMS message converter 205; a network management event distributor 210; a network connection manager 215; a firewall configuration manager 220; an authorization manager 225; a resource reservation manager 230; an Internet access manager 240, and a user interface 235. The structure of the remote user terminal 2 may correspond with that of the home computer 1, thus its description will be omitted.

The SMS message interface 201 receives an SMS message from the remote user terminal 2 or sends an SMS message to the remote user terminal 2 via the SMS channel. The SMS message converter 205 analyzes the SMS message received from the remote user terminal 2 by the SMS message interface 201 via the SMS channel, according to the SMS message format predetermined between the home computer 1 and the remote user terminal 2, and converts the SMS message into the corresponding event according to the contents of the SMS message. Events may include instructions and their parameters for performing network management tasks.

Figure 3:
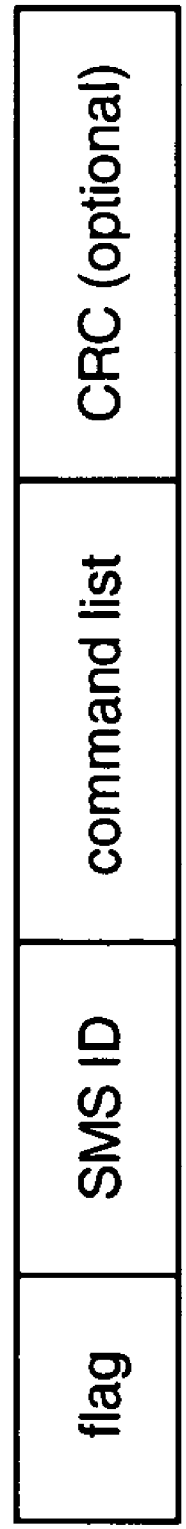
FIG. 3 shows an exemplary SMS message format according to the invention.

The exemplary SMS message format shown in FIG. 3 may be employed. This format includes a two-byte flag; a one-byte SMS ID; a command list, and optionally a two-byte CRC. The flag is used to distinguish the SMS message according to the invention from other kinds of SMS messages having other functions. The SMS ID is used to recognize the identification number of the SMS message sent by a sender. The command list includes the instruction contents. The command list may include multiple commands. The particular format shown in FIG. 3 is illustrative of the invention rather than limiting, of course, and other message formats may be used as well.

The network management event distributor 210 distributes events generated by the SMS message converter 205 to the corresponding network connection manager 215, the firewall configuration manager 220, the authorization manager 225, the Internet access manager 240, or the resources reservation manager 230. Specifically, the network management event distributor 210 analyzes the instruction in an event, and distributes a network connection event to the network connection manager 215 when the instruction is to do network connection; distributes a firewall configuration event to the firewall configuration manager 220 when the instruction is to configure the firewall rules; distributes an authorization setting event to the authorization manager 225 when the instruction is to set the authorizations; distributes a network resource reservation event to the resources reservation manager 230 when the instruction is to do the network resource reservation; and distributes an Internet management event to the Internet access manager 240 when the instruction is to access to or to disconnect from the Internet.

The network connection manager 215 processes according to the instruction contents of the received event. Three cases arise in which the instruction contents are to establish a network connection with the remote user terminal 2. In the first case, in which the home computer 1 has a fixed IP address, the network connection manager 215 extracts from the received event the address information sent by the remote user terminal 2, which indicates the current network position of the remote user terminal 2 such as the IP address, the proxy address, or the NAT address of the remote user terminal 2. The network connection manager 215 then generates a "return" event, which includes the IP address of the home computer 1. The network management event distributor 210 sends this "return" event to the SMS message converter 205, which in turn converts the "return" event into an SMS message and sends the SMS message back to the remote user terminal 2 via the SMS message interface 201. Through the above processes, network connection information is exchanged between the home computer 1 and the remote user terminal 2 so that they can immediately establish a network connection via conventional connection protocol.

In the second case, in which the home computer 1 has no fixed IP address and the remote user terminal 2 has a fixed IP address, the network connection manager 215 may directly instruct the CPU of the home computer 1 to execute the operation of accessing the remote user terminal 2 based on the IP address of the remote user terminal 2 extracted from the event. Of course, the processing in the first case can be executed in a way similar to that in the second case instead of sending the "return" SMS message back to the remote user terminal 2.

In the third case, when neither the home computer 1 nor the remote user terminal 2 has a fixed IP address, for example when both of them use NAT to determine the network addresses, either the remote user terminal 2 or the home computer 1 acquires the NAT mapped IP address of its counterpart. A network connection is established by the network connection manager of its counterpart. In the above three cases, if the network connection manager 215 of the home computer 1 can extract the IP address of its counterpart, it can directly establish a network connection with its counterpart. Otherwise, it will notify its counterpart of its own IP address via the SMS message and let its counterpart start to establish the connection.

The firewall configuration manager 220 configures or updates the rules of the firewall in the home computer 1 according to instructions and parameters included in the firewall configuration event.

The authorization manager 225 modifies the access authorization information of the home computer 1 according to instructions and parameters included in the authorization management event.

The resource reservation manager 230 sets the resource reservation of the home computer 1 according to instructions and parameters included in the resource reservation event.

When the content of the instruction is to connect to or to disconnect from the Internet, the Internet access manager 240 instructs the CPU of the home computer 1 to execute the operation of connection or disconnection.

The user interface 235 sends information entered by the user to the corresponding manager, which in turn executes the operation of local network connection, local firewall configuration, local authorization management, local resource reservation, or local Internet access. And, if needed, the respective manager generates a corresponding event and sends it either via the network management event distributor 210 or directly (not shown in the figure) to the SMS message converter 205. The SMS message converter 205 then converts the event into an SMS message and notifies the external remote user terminal 2 via the SMS message interface 201. In addition, the user can also input the control information for the remote user terminal 2 such as network connection, firewall configuration, authorization management, resource reservation management, and Internet access via the user interface 235. The respective manager then generates a corresponding event and sends it either via the network management event distributor 210 or directly (not shown in the figure) to the SMS message converter 205. The SMS message converter 205 then converts the event into an SMS message and sends it to the external remote user terminal 2 via the SMS message interface 201 so as to implement the control of the remote user terminal 2.

FIG. 4 shows an exemplary operational flow diagram of the network management system. The SMS message interface 201 receives an SMS message (step 401). The SMS message converter 205 then converts the SMS message into a corresponding event (step 402). The network management event distributor 210 distributes the event to a corresponding specific manager (step 403). The manger executes the corresponding operation (step 404).

Although the network management system and method according to the invention have been illustrated with reference to the home computer 1, those skilled in the art will now recognize that similar processing can also be used to access the remote user terminal 2 from the home computer 1.

In addition, although the home computer 1 and the remote user terminal 2 are used in the exemplary embodiments described above, those skilled in the art will now recognize that any type of computer, network, or terminal equipment that employs SMS message transmission control information can be used as well according to the invention.

We claim:

1. A network management method for securely managing a computer resource from a remote user terminal, comprising:
   receiving a network management command in said computer resource from said remote user terminal, wherein both said remote user terminal and said computer resource comprise a Short Message Service (SMS) interface, said network management command being transmitted from said remote user terminal to said computer resource as an SMS message comprising a flag identifying said SMS message as a network management message, said network management command comprising a network address corresponding to said remote user terminal;
   in response to a determination that said computer resource is able to identify said network address corresponding to said remote user terminal, executing the network management command with said computer resource to establish a network connection between said remote user terminal and said computer resource using said network address; and
   in response to a determination that said computer resource is unable to identify said network address corresponding to said remote user terminal, transmitting a network address of said computer resource to said remote user terminal.

2. The network management method according to claim 1, wherein said network address comprises an Internet Protocol (IP) address.

3. The network management method according to claim 1, wherein the network management command further comprises at least one of the following: an Internet access command, an Internet disconnection command, a network connection command, a firewall configuration command, a resource reservation command, and an authorization command.

4. The method of claim 1, wherein said receiving said network management command in said computer resource with said SMS interface comprises decrypting said network management command from an encrypted SMS message.

5. A network management system, comprising:
   a computer resource and a user terminal, wherein said computer resource and said user terminal each comprise a Short Message Service (SMS) message interface configured to send and receive SMS messages; and
   wherein said computer resource further comprises:
      an SMS message converter configured to identify a network address corresponding to said user terminal in a received network management command, said network management command having been received as an SMS message from said user terminal, said SMS message comprising a flag identifying said SMS message as a network management message; and
   a manager configured to:
      establish a network connection between said computer resource and said user terminal using said network address according to an instruction in said network management command in response to a determination that said SMS message converter is able to identify said network address corresponding to said user terminal from said network management command; and
      transmit a network address of said computer resource to said user terminal via SMS in response to a determination that said SMS message converter is unable to identify said network address corresponding to said user terminal from said network management command.

6. The network management system according to claim 5, wherein the computer resource and user terminal each include a user input interface for accepting an instruction entered by a user; wherein the manager generates an event according to the instruction entered by the user; the SMS message converter converts the event into a second SMS message; and the SMS message interface sends the second SMS message to a counterpart to be managed.

7. The network management system of claim 5, wherein said computer resource and said user terminal each comprise a mobile phone that comprises said SMS message interface.

8. The network management system of claim 5, wherein said network address comprises an Internet Protocol (IP) address.

9. The network management system of claim 5, wherein said SMS message converter is further configured to convert received SMS messages from said user terminal into network management events and said network management system further comprises a network management event distributor configured to distribute said network management events among a plurality of network management modules in said computer resource.

10. The network management system according to claim 9, wherein said network management modules comprise at least one of the following:
   a network connection manager for establishing a network connection according to distributed network management events received from said user terminal via SMS;
   a firewall configuration manager for setting firewall rules according to distributed network management events received from said user terminal via SMS;
   an authorization manager for setting authorization information according to distributed network management events received from said user terminal via SMS;
   a resource reservation manager for reserving resources according to distributed network management events received from said user terminal via SMS;

an Internet access manager for accessing the Internet according to distributed network management events received from said user terminal via SMS; and an Internet access manager for disconnecting from the Internet according to distributed network management events received from said user terminal via SMS.

11. The network management system of claim 5, wherein said network address corresponding to said user terminal is encrypted within said SMS message.

12. A computer, comprising:

a Short Message Service (SMS) message interface for receiving SMS messages;

an SMS message converter configured to identify a network address corresponding to a user terminal in a received network management command, said network management command having been received in an SMS message from said user terminal, said SMS message comprising a flag identifying said SMS message as a network management message; and a manager configured to:

establish a network connection between said computer resource and said user terminal using said network address according to an instruction in said network management command in response to a determination that said SMS message converter is able to identify said network address corresponding to said user terminal from said network management command; and transmit a network address of said computer resource to said user terminal via SMS in response to a determination that said SMS message converter is unable to identify said network address corresponding to said user terminal from said network management command.

13. The network computer of claim 12, wherein said SMS message converter is further configured to convert received SMS messages from said user terminal into network management events and said network management system further comprises a network management event distributor configured to distribute said network management events among a plurality of network management modules in said computer resource.

14. The computer according to claim 13, wherein the said network management modules comprise at least one of the following:

a firewall configuration manager for setting firewall rules according to distributed network management events received from said user terminal via SMS;

an authorization manager for setting authorization information according to distributed network management events received from said user terminal via SMS;

a resource reservation manager for performing resource reservations according to distributed network management events received from said user terminal via SMS;

an Internet access manager for accessing the Internet according to distributed network management events received from said user terminal via SMS; and an Internet access manager for disconnecting from the Internet according to distributed network management events received from said user terminal via SMS.

15. The computer according to claim 12, further comprising a user input interface for accepting an instruction entered by a user, wherein the manager generates an event according to the instruction entered by the user; the SMS message converter converts the event into a second SMS message; and the SMS message interface sends the second SMS message.

16. The computer of claim 12, wherein said computer resource comprises a connection with a mobile phone that comprises said SMS message interface.

17. The network computer of claim 12, wherein said network address comprises an Internet Protocol (IP) address.

* * * * *